United States Patent [19]

Manabe et al.

[11] Patent Number: 4,967,212

[45] Date of Patent: Oct. 30, 1990

[54] IMAGE RECORDER

[75] Inventors: Yoshiharu Manabe; Junko Tomita, both of Kawasaki; Atsushi Shinozaki, Chiba, all of Japan

[73] Assignee: Ricoh Company, Ltd., Tokyo, Japan

[21] Appl. No.: 414,306

[22] Filed: Sep. 29, 1989

[30] Foreign Application Priority Data

Sep. 30, 1988 [JP] Japan .................... 63-246695

[51] Int. Cl.⁵ .................... G01D 15/06
[52] U.S. Cl. .................... 346/160
[58] Field of Search .................... 346/153.1, 160

[56] References Cited

U.S. PATENT DOCUMENTS 4,709,250 11/1987 Takeuchi .................... 346/160
4,713,672 12/1987 Horihata et al. .................... 346/160
4,761,662 8/1988 Yoshimoto et al. .................... 346/160 X
4,864,419 9/1989 Saito et al. .................... 346/153.1 X Primary Examiner—Donald A. Griffin
Attorney, Agent, or Firm—Oblon, Spivak, McClelland, Maier & Neustadt

[57] ABSTRACT

An image recorder capable of recording an image by a predetermined line width with no regard to the operating conditions and ambient conditions by causing the line width of an image into coincidence with a predetermined referece line width. A driver controllably drives an exposing device in response to optical data. A line width sensor means the line width of a visible image developed by a developing device. Control means controls, in response to the line width sensed by the sensor, the driver such that the line width coincides with a predetermined reference line width, and corrects the controllable drive of the exposing device by the driver.

8 Claims, 5 Drawing Sheets

| Vt / Vp | FEEDBACK STEP | CORRECTED LIGHT AMOUNT (erg/cm²) |
|---|---|---|
| 0.3675~ | +2 | 18.4 |
| 0.3100~0.3675 | +1 | 17.2 |
| 0.2550~0.3100 | 0 | 16 |
| 0.2100~0.2550 | -1 | 14.8 |
| 0.1675~0.2100 | -2 | 13.6 |
| 0.1325~0.1675 | -3 | 12.4 |
| 0.1025~0.1325 | -4 | 11.2 |
| ~0.1025 | -5 | 10.0 |

IMAGE RECORDER

BACKGROUND OF THE INVENTION

The present invention relates to an image recorder of the kind using an electrophotographic procedure and, more particularly, to an image recorder capable of producing a clear-cut image having a predetermined line width at all times with no regard to its operating conditions and ambient conditions by causing the line width of an image into coincidence with a predetermined reference width.

A prerequisite with a laser printer, facsimile machine, electrophotographic copier or similar electrophotographic image recorder is the stable image reproducibility. A current trend in the image recorders art is, therefore, toward a digital and high-density architecture. In parallel with this trend, there is an increasing demand for the high reproducibility and stability of a line width which is the basis of character images and graphic images, i.e., the reproducibility of a minimum pixel density. It has been reported that a line image or a dot image available with an electrophotographic image recorder undergoes a change in line width due to changes in various factors such as operating conditions and ambient conditions. Typical of such factors are the sensitivity of a photoconductive element, or image carrier, which varies with temperature, and the surface condition of the same which is susceptible to ozone and other harmful gases generated by various chargers. Another factor having influence on the line width is the particle size of a toner which is used as a developer. The change in line width is apt to thicken, deface, thin or blur reproduced characters and lines.

A printer with an implementation for adjusting the line width and density of an image has been proposed, as disclosed in Japanese Patent Laid-Open Publication (Kokai) No. 61-25161. The printer taught in this Laid-Open Patent Publication has an exclusive switch provided on an operation board and accessible for selecting a line width. The amount of laser light is controlled on the basis of the selected line width. Specifically, based on the fact that the line width decreases with an increase in the amount of laser light and increases with a decrease in the laser light, the printer controls the line width of an image. The operation board is also provided with another exclusive switch assigned to density. This switch is operable to change the voltage to be applied to a charger and thereby the image density, the voltage increasing with the selected density.

Japanese Laid-Open Patent Publication No. 63-67073 discloses a laser light modulation system which enhances reproducibility by preventing reproduced images from being defaced or blurred due to thickening or thinning of the line width. Generally, black thin lines and white thin lines tend to thicken themselves in an image scanning type system and a background type system, respectively. In the light of this, the modulation system shown and described in Laid-Open Patent Publication No. 63-67073 reduces the amount of laser light when a pixel of interest corresponds to such a thin line, thereby achieving a desired thin line. Further, white thin lines and black thin lines tend to thin themselves in the image scanning type system and the background type system, respectively. To cope with this tendency, the modulation system reduces the amount of laser light which indirectly forms a pixel of interest.

While the printer taught in Laid-Open Patent Publication No. 61-25161 allows one to select a desired line width and a desired density by manipulation, it cannot control the line width and density to predetermined reference values automatically in association with the operating conditions and ambient conditions. On the other hand, the system disclosed in Laid-Open Patent Publication No. 63-67073 reduces the amount of laser for a thin line which is produced by the irradiation of laser light and apt to thicken, while increases the amount of laser light associated with pixels around the thin line for a thin line which is produced by the non-irradiation of laser light. This system, therefore, does not contemplate to eliminate changes in light width ascribable to the changes in the characteristics of a photoconductive element and developing device which are caused by the varying operating conditions and ambient conditions, i.e., the idea is not to maintain the line width after development constant. With the proposed system, it is impracticable to control the line width to a reference value automatically in association with the operating conditions and ambient conditions.

SUMMARY OF THE INVENTION

It is therefore an object of the present invention to provide an image recorder capable of recording an image by a desired line width at all times with no regard to the changes in operating conditions and ambient conditions by causing the line width of an image into coincidence with a predetermined reference width.

It is another object of the present invention to provide a generally improved image recorder.

In accordance with the present invention, in an image recorder for causing an exposing device to render optical data representative of an image on a photoconductive element in the form of a latent image, causing a developing device to develop the latent image, and transferring the resulting developed image to a recording medium, a driver controllably drives the exposing device in response to the optical data. A line width sensor senses a line width of the developed image. A controller controls in response to the line width sensed by the line width sensor, the driver such that the line width coincides with a predetermined reference line width, and corrects controllable drive of the exposing device by the driver.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, how the line width of an image to be reproduced fluctuates will be described specifically.

Figure 1:
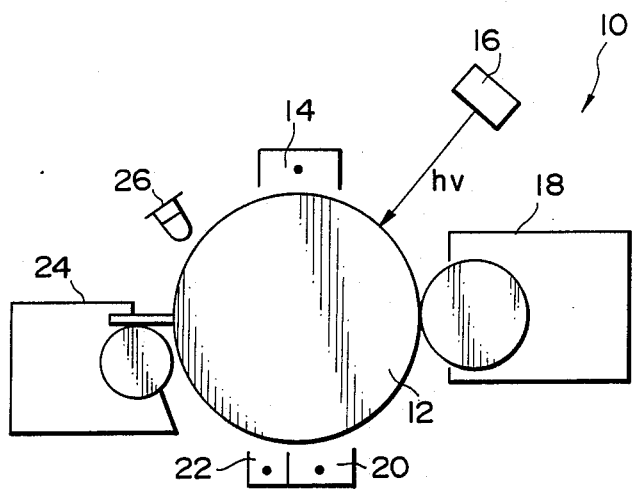
FIG. 1 is a section schematically showing an electrophotographic copier representative of an image recorder to which the present invention is applicable.

Referring to FIG. 1, an electrophotographic copier belonging to a family of image recorders to which the present invention is applicable is shown. The copier, generally 10, has a photoconductive element in the form of a drum 12 which in this example is implemented by an organic material. Arranged around the drum 12 are a main charger, 14, an exposing device 16 for imagewise exposure, a developing device 18, an image transferring device 20, a paper separating device 22, a cleaning device 24, and a discharger 26. The drum 12 is uniformly charged by the main charger 14 to have a surface potential distribution VD. When a laser beam scans the drum 12 via the exposing device 16, the surface potential distribution on the drum 12 is changed to form an electrostatic latent image, i.e., a latent image potential configuration is provided on the drum surface on the basis of the distribution of radiated energy. Then, the developing device 18 effects reversal development for causing a toner to deposit in those portions of the drum 12 where the potential has been lowered.

Figure 2:
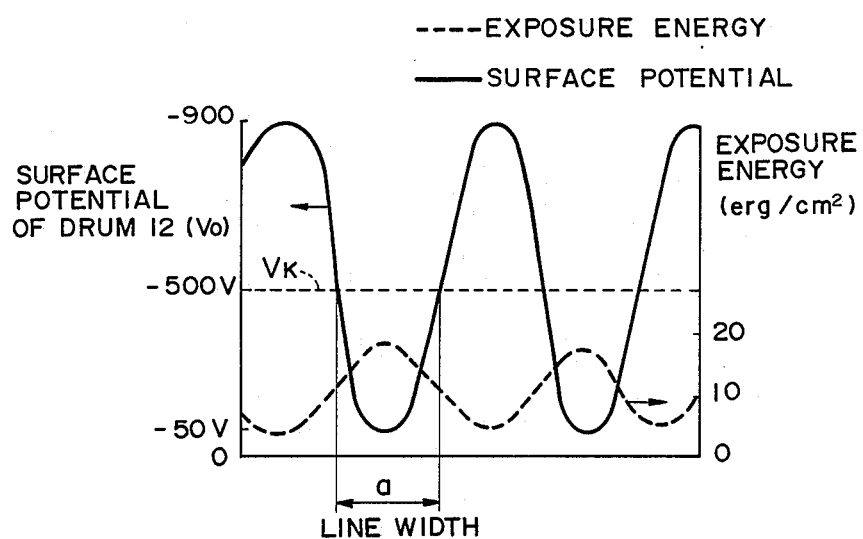
FIG. 2 is a graph showing a relationship between the exposure energy distribution and the surface potential distribution on a photoconductive element.

When a laser beam is turned on and off on a minimum pixel density basis, the exposure energy distribution and the latent image potential distribution on the drum 12 vary as represented by curves in FIG. 2. On the drum 12 having a latent image potential distribution shown in FIG. 2, the toner fed from the developing device 18 deposits in those areas where the voltage is lower than a given development starting voltage VK, e.g. $-500$ volts. The image formed by the toner has a line width $\alpha$ as shown in FIG. 2. Various conditions of the optics 16 such as beam power, beam diameter and pixel frequency are so selected as to allow the line width $\alpha$ to have 100 percent reproducibility relative for a writing density.

Figure 3:
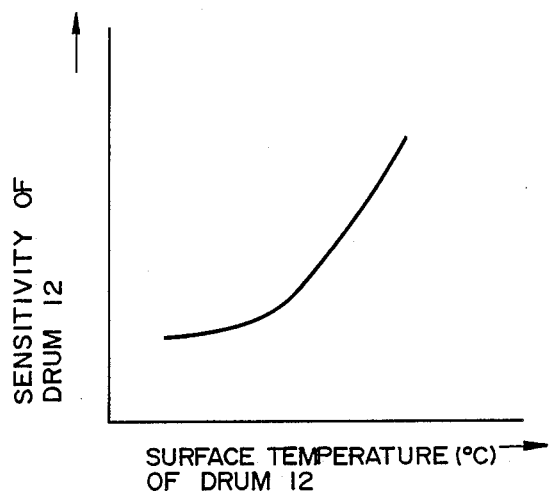
FIG. 3 is a graph showing a relationship between the surface density and the sensitivity of a photoconductive element.
Figure 4:
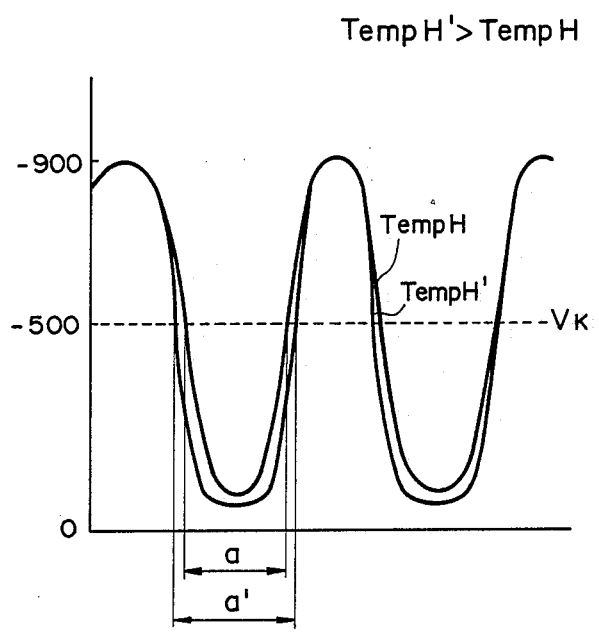
FIG. 4 is a graph indicative of temperature dependency of the surface potential distribution of a photoconductive element.
Figure 5:
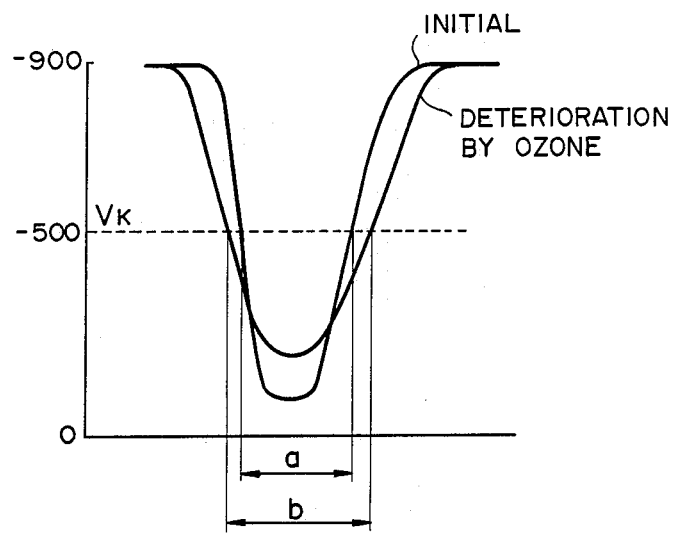
FIG. 5 is a graph demonstrating the deterioration of the surface potential distribution on a photoconductive element due to ozone.
Figure 6:
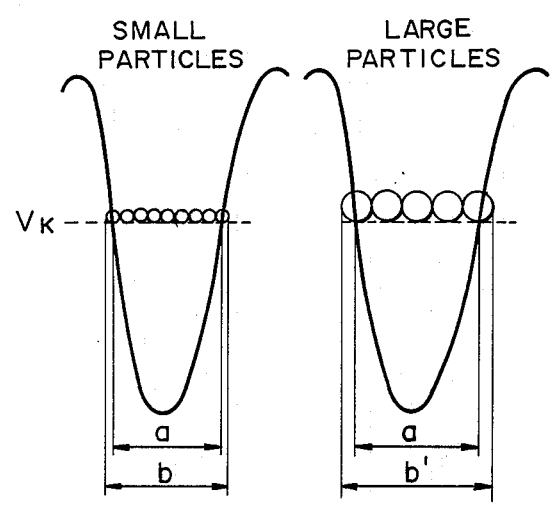
FIG. 6 is a schematic view showing the fluctuation of the surface potential distribution on a photoconductive element ascribable to the particle size of toner.

However, a problem is that the line width of a reproduction is effected by various factors. One of the factors is the temperature dependency of the drum 12. Specifically, as the operation of the copier continues, the surface temperature of the drum 12 sequentially elevates due to the elevating temperature inside the copier and changes in ambient conditions and, in turn, changes the sensitivity of the drum 12, as indicated in FIG. 3. In this condition, the potential distribution of a 1-dot line latent image varies as represented by curves in FIG. 4, i.e., the line width changes from $\alpha$ to $\alpha'$ with respect to the given development starting voltage VK. Conversely, when the surface temperature of the drum 12 drops, the sensitivity of the drum 12 is lowered resulting in the line width being reduced. Another factor which has influence on the line width is the deterioration of the drum 12 which is ascribable to ozone and other harmful gases. Such harmful gases are generated in the copier 10 by the main charger 14, image transferring device 20 and paper separating device 22 all of which are implemented by corona discharge. When the harmful gases deposit on the surface of the drum 12, they effect the surface resistance or the transverse diffusion of the drum 12 to change the potential distribution as shown in FIG. 5, i.e., the line width changes from $\alpha$ to b. This phenomenon is pronounced especially when the drum 12 is exposed to ozone for a long time due to a continuous operation of the copier 10. A change in the particle size of a toner is still another factor which effects the line width. Specifically, while the toner in the developing device 18 has a certain particle size distribution due to the supply of fresh toner, particles having comparatively small sizes are consumed at an initial stage so that, as the device 18 approaches a toner end condition, only particles having comparatively large sizes are left. As a result, as shown in FIG. 6, the line width b actually developed by the device 18 is acceptably faithful to the line width $\alpha$ of the latent image distribution when small toner particles are present, but it increases to a line width b' which is greater than $\alpha$ when the particle size available is large.

The change in the sensitivity of the drum 12, the deterioration of the drum 12 and the change in the particle size of a toner discussed above translate into a change in the line width of a reproduction. The change in line width is apt to thicken, deface, thin or blur characters and lines.

Figure 7:
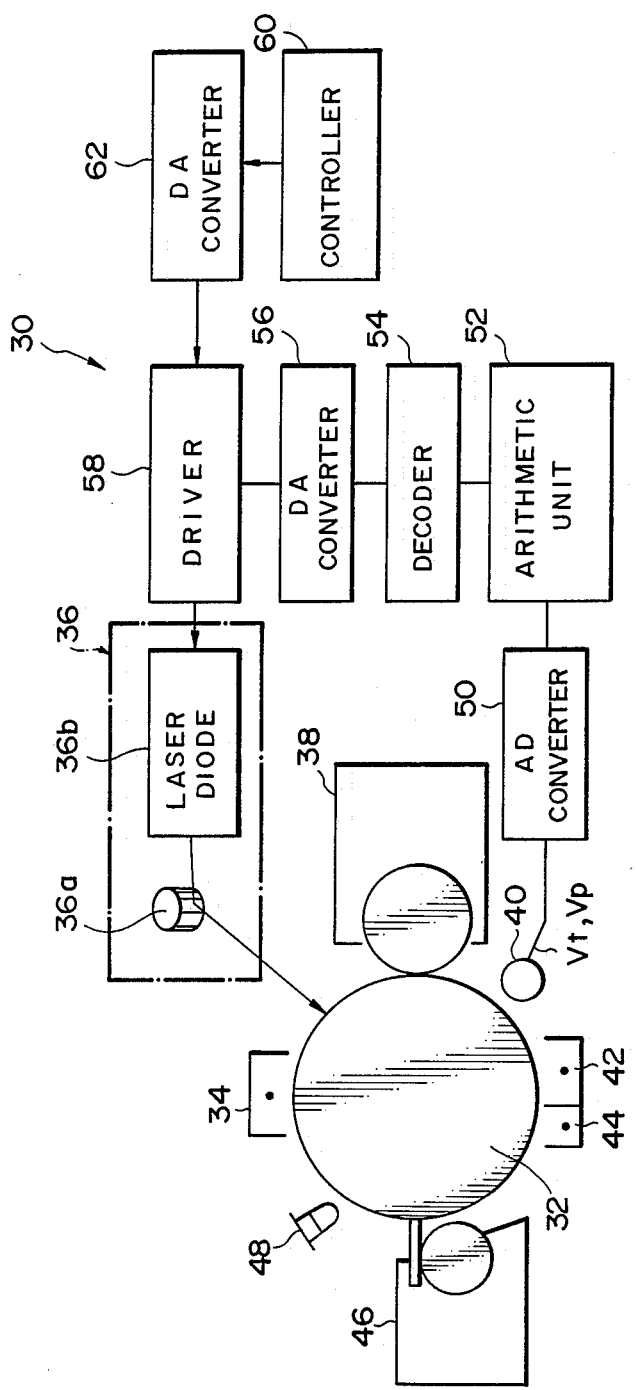
FIG. 7 is a schematic block diagram showing, partly in a section, an image recorder embodying the present invention.

Referring to FIG. 7, an image recorder embodying the present invention is shown and generally designated by the reference numeral 30. As shown, the image recorder 30 has a photoconductive element 32 which serves as an image carrier and, in the illustrative embodiment, is implemented as a drum. Arranged around the drum 32 are a main charger 34 for uniformly charging the drum 32, an exposing device 36 made up of optics 36a and a laser diode 36b for scanning the drum 32 in response to optical data, a developing device 38 for converting a latent image formed on the drum 32 by the exposure into a toner image, a reflection type photosensor 40 responsive to the toner image on the drum 32, an image transferring device 42 for transferring the toner image from the drum 32 to a paper sheet, a paper separating device 44 for separating the paper sheet from the drum 32, a cleaning device 46 for removing toner particles from the drum 32, and a discharging device 48 for dissipating the charge on the drum 32. The photosensor 40 plays the role of a line width sensing unit, as will be described in detail later. The photosensor 40 is connected to an analog-to-digital (AD) converter 50 which is in turn connected to an arithmetic unit 52. A driver 58 is connected to the arithmetic unit 52 via a decoder 54 and a digital-to-analog (DA) converter 56. The laser diode 36b is connected to the driver 58. A DA converter 62 is connected to a controller 60, while the driver 58 is connected to the DA converter 62.

In operation, a laser beam issuing from the laser diode 36b and carrying optical data which is representative of a reference pattern illuminates a particular area of the drum 32 other than an imaging area. As a result, a reference pattern is formed on the drum 32 as a latent image. The developing device 38 develops the latent image to render the reference pattern visible. On sensing the reference pattern, the photosensor 40 produces a voltage level signal Vt. A pattern region which does not become visible is provided inside or outside of the reference pattern. On sensing this invisible pattern, the photosensor 40 outputs a voltage level signal Vp. The AD converter 50 digitizes the voltage level signals Vt and Vp and delivers the resulting signals to the arithmetic unit 52. In response, the arithmetic unit 52 produces a ratio of the signal Vt to the signal Vp, i.e. Vt/Vp. The use of the ratio Vt/Vp is successful in causing a change in the positional measuring conditions on the drum 32 and a change in the measuring conditions of the photosensor 40 due to aging to cancel each other.

The arithmetic unit 52 produces a difference between the resulting Vt/Vp and a relative level associated with a predetermined reference line width, the difference defining a feedback step. The feedback step is decoded by the decoder 54 and then fed to the DA converter 56. The DA converter 56 converts the decoded output of the decoder 54 into an analog signal and applies it to the driver 58 as drive correction data. Implemented as an analog circuit, the driver 58 is driven by optical information which is fed from the controller 60 and then processed by the DA converter 62. The driver 58 energizes the laser diode 36b in response to such optical information, whereby the drum 32 is exposed by the exposing device 36. The driver 58 has a control correction terminal, not shown, which is connected to the DA converter 56. When the output signal of the DA converter 46 representative of a difference between the ratio Vt/Vp and the relative level as previously stated is applied to the control correction terminal, the driver 58 corrects the optical information which is fed thereto from the DA converter 62.

Figures 8, 9:
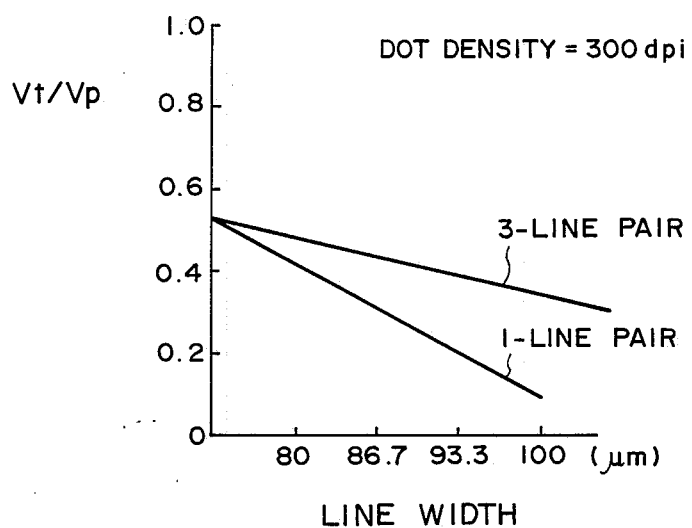
FIG. 8 is table listing correction data applicable to the illustrative embodiment.
FIG. 9 is a graph representative of the operation of a line width sensor included in the illustrative embodiment.

FIG. 8 tabulates corrected data which are selectively fed to the laser diode 36b. As shown, the feedback step is changed within the range of +2 to −5 in association with the ratio Vt/Vp. Corrected light quantities of 18.4 to 10.0 (energy/square centimeter) are individually assigned to such feedback steps.

The laser diode 36b, therefore, emits a laser beam representative of an image data signal which has been corrected on the basis of the result of decision regarding the reference pattern. Consequently, image data undergone development, i.e., a visible image is transferred to a paper sheet with a predetermined width.

In the illustrative embodiment, the amount of correction is selected in matching relation to the operating conditions of an image recorder by taking account of toner particle size, ozone generation, and operational characteristics of a laser diode and the like.

In the embodiment shown and described, the detection of a line width is implemented by the reflection type photosensor 40. This type of photosensor 40 is often used to sense a density for thereby controlling a toner image density, as with many of prior art image recorders. In the illustrative embodiment, a deviation of line width is determined by producing a ratio Vt/Vp from the output of the photosensor 40.

FIG. 9 indicates a relationship between the ratio Vt/Vp and the line width with respect to a dot density of 300 dots per inch. For such a dot density, a standard line width of one line is about 84.7 microns. As shown in FIG. 9, the gradient of Vt/Vp noticeably differs from a 3-line pair wherein three lines are developed and three lines are not developed to a 1-line pair wherein one line is developed and one line is not developed. The gradient of the characteristic line is constant with each of the 3-line and 1-line pairs, allowing the deviation of line width to be determined with accuracy in terms of average density.

In FIG. 7, the control over the AD converter 50 to the DA converters 56 and 62 may be implemented by a microcomputer for simplifying hardware. The emission of the laser diode 36b may be controlled by any of conventional technologies, i.e., pulse control, emission intensity control, and beam diameter control.

As stated above, in the illustrative embodiment, the photosensor 40 and arithmetic unit 52 detect the line width of a visible image which fluctuates due to the deterioration ascribable to ozone, the irregular particle size distribution of a toner and the ambient temperature of the machine. In response to the detected line width, the driver 58 drives the laser diode 36b such that the line width coincides with the predetermined reference line width. This allows an image to be formed with a predetermined line with at all times with no regard to the varying operating conditions and ambient temperature.

If desired, the reflection type photosensor 40 which serves as a line width sensor may be replaced with a CCD (Charge Coupled Device) array capable of sensing a line with directly. While the embodiment shown and described has concentrated on the control which uses line width only, the control effect will be further enhanced if other factors such as the number of reproductions produced are also taken into account. The present invention is applicable not only to an image recorder of the type adopting two-level control but also to an image recorder which can render mid-tone by controllably driving a laser diode driver, needless to mention.

In summary, it will be seen that the present invention provides an image recorder which is capable of producing clear-cut images having a predetermined line width with no regard to the operating conditions and ambient temperature of the recorder.

Various modifications will become possible for those skilled in the art after receiving the teachings of the present disclosure without departing from the scope thereof.

What is claimed is:

1. An image recorder for causing exposing means to render optical data representative of an image on a photoconductive element in the form of a latent image, causing developing means to develop said latent image, and transferring the resulting developed image to a recording medium, said image recorder comprising:
   driving means for controllably driving said exposing means in response to the optical data;
   line width sensing means for sensing a line width of the developed image; and
   control means for controlling, in response to the line width sensed by said line width sensing means, said driving means such that said line width coincides with a predetermined reference line width, and correcting controllable drive of said exposing means by said driving means, said control means comprising arithmetic means for producing a difference between the sensed line width and the reference line width.

2. An image recorder as claimed in claim 1, wherein said line width sensing means comprises a reflection type photosensor.

3. An image recorder as claimed in claim 1, wherein said line width sensing means comprises a CCD array.

4. An image recorder for causing charging means to uniformly choose a photoconductive element, causing exposing means to render optical data representative of an image on the charged photoconductive element in the form of a latent image and to render optical data representative of a reference pattern on the charged photoconductive element in the form of a latent image, and causing developing means to develop said latent images, said image recorder comprising:

line width sensing means for sensing a line width of the developing visible image of the reference pattern; and correcting means for correcting operating conditions of the recorder by causing the line width of the visible image of the reference pattern sensed by said line width sensing means into coincidence with a predetermined reference line width.

5. An image recorder as claimed in claim 4, wherein the operating conditions are corrected by controlling said exposing means to adjust an amount of exposure.

6. An image recorder as claimed in claim 4, wherein said line width sensing means comprises a reflection type photosensor.

7. An image recorder as claimed in claim 4, wherein said line width sensing means comprises a CCE array.

8. An image recorder as claimed in claim 4, wherein said correcting means comprises arithmetic means for producing a difference between the sensed line width of the visible image of the reference pattern and the predetermined reference width.

* * * * *